US010767358B2

(12) United States Patent
Tiagai (10) Patent No.: US 10,767,358 B2
(45) Date of Patent: Sep. 8, 2020

(54) ELECTRONIC AUTOMATICALLY ADJUSTING BIDET WITH MACHINE LEARNING SOFTWARE

(71) Applicant: Ilan Tiagai, Marblehead, MA (US)

(72) Inventor: Ilan Tiagai, Marblehead, MA (US)

(*) Notice: Subject to any disclaimer, the term of this patent is extended or adjusted under 35 U.S.C. 154(b) by 24 days.

(21) Appl. No.: 15/990,847

(22) Filed: May 29, 2018

(65) Prior Publication Data

US 2019/0368179 A1 Dec. 5, 2019

(51) Int. Cl.
| | |
|---|---|
| *E03D 9/08* | (2006.01) |
| *G06T 7/00* | (2017.01) |
| *G06K 9/00* | (2006.01) |
| *G06T 7/20* | (2017.01) |
| *G06T 7/11* | (2017.01) |

(52) U.S. Cl.
CPC ............ *E03D 9/08* (2013.01); *G06K 9/00362* (2013.01); *G06T 7/0012* (2013.01); *G06T 7/11* (2017.01); *G06T 7/20* (2013.01); *G06T 7/97* (2017.01); *G06T 2207/30196* (2013.01)

(58) Field of Classification Search
CPC .... E03D 9/08; G06T 7/11; G06T 7/20; G06T 7/97; G06T 7/0012; G06T 2207/30196; G06K 9/00362
See application file for complete search history.

(56) References Cited

U.S. PATENT DOCUMENTS

| | | | | |
|---|---|---|---|---|
| 9,212,477 | B2 * | 12/2015 | Tiagai | ................... G06T 1/0014 |
| 9,756,297 | B1 * | 9/2017 | Clements | ............. A61B 5/0077 |
| 9,930,232 | B2 * | 3/2018 | Peng | .................... H04N 5/2252 |
| 2011/0302709 | A1 * | 12/2011 | Taylor | ................ A61M 3/0208 |
| | | | | 4/443 |
| 2015/0059076 | A1 * | 3/2015 | Tiagai | ....................... E03D 9/08 |
| | | | | 4/447 |
| 2017/0058500 | A1 * | 3/2017 | Garrels | .................... E03D 9/032 |
| 2017/0260728 | A1 * | 9/2017 | Hall | ......................... E03D 9/08 |
| 2019/0203454 | A1 * | 7/2019 | Hall | ................... G06K 9/00362 |
| 2019/0369085 | A1 * | 12/2019 | Tan | ....................... A61B 10/007 |

* cited by examiner

*Primary Examiner* — Bobbak Safaipour
(74) *Attorney, Agent, or Firm* — Daniel N. Smith (57) ABSTRACT

An electronic bidet system that uses one or more internal cameras to capture images or video of a user as he or she sits on the bidet. The images or video are analyzed using machine learning computer vision technology to identify, and locate, the types, sizes, shapes, and positions of the lower body orifices, and conditions (e.g. hemorrhoids), in the user's genital and rectal areas as well as update the computational model of the user's genital and rectal areas and the computational model for cleaning the user's rectal and genital areas. Based on these analyzed images or video, the system automatically and repeatedly adjusts the bidet settings for the specific conditions (e.g. hemorrhoids) and types of orifices, locations of orifices, sizes of orifices, shapes of orifices, gender, body type, and weight of the user. Furthermore, machine learning software is used to control the cleaning and drying cycles.

18 Claims, 6 Drawing Sheets

ELECTRONIC AUTOMATICALLY ADJUSTING BIDET WITH MACHINE LEARNING SOFTWARE

FIELD OF THE INVENTION

The field of the invention relates to an electronic bidet system that uses internal cameras and machine learning computer vision technology to identify, locate, and computationally model a user's lower body orifices such that the system automatically and reliably adjusts the bidet settings for the specific types of orifices, locations of orifices, sizes of orifices, shapes of orifices, gender, body type, weight, and other characteristics of the user. The electronic bidet system also uses machine learning to control the cleaning and drying cycles of the user's lower body orifices.

BACKGROUND OF INVENTION

A bidet is a bathroom mounted plumbing fixture that uses clean water, ejected through a nozzle, to wash the genitalia, inner buttock, and anus, without the use of any paper tissue.

Due to the increasing ease of use, functionality, and cleanliness, bidets are being installed in more locations that have multiple users or users with disabilities. Bidets are becoming more common in hospitals because of their utility in maintaining hygiene and their ease of use for disabled or elderly patients. Bidets often make toileting possible for disabled and elderly users, affording them greater opportunity for independence.

Most modern bidets are similar in structure to a toilet. Bidets are usually permanently affixed to a water supplying means and include a water reservoir tank, a bowl with a rim, a seat, a seat lid, a first fluid nozzle for ejecting water discharged from the water reservoir tank to a user's genital and rectal areas, a second fluid nozzle for cleaning the water discharged from the water reservoir tank onto the user, and a third fluid nozzle to clean the first and/or second fluid nozzles. A bidet may also be a nozzle attached to an existing toilet, or a part of the toilet itself.

Modern bidets are often equipped with many electronically controlled functions that provide a more pleasant experience for the user. Some of these functions include, but are not limited to: a heating means for heating the water in the water reservoir tank to maintain the water at a certain temperature, a heating means for the bidet seat, a control means for adjusting the amount of water ejected from the fluid nozzles, and novel fluid nozzles that eject water in patterns that massage a user's genital and rectal regions.

Modern bidets are also often equipped with electronically controlled functions that allow the devices to be more easily controlled. Some of these functions include, but are not limited to: remote controls to activate the water fluid nozzles, adjustable water pressure, temperature compensation, and seating sensors for detecting whether a user is seated on the bidet seat.

Two relatively new features of modern bidets include fluid nozzle directional control and seating sensors for detecting whether a user is seated on the bidet seat. The seating sensors often use infrared or weight sensors to detect the presence of a user sitting on the bidet seat or approaching the bidet. Once a user is detected, these bidets activate from a power saving mode, which may include flushing the bowl before or after bidet use to ensure that each subsequent user has a fresh bidet. The fluid nozzle directional control may allow a user to adjust one of more or the fluid nozzles for a better cleaning experience.

Despite the increased options and functionality, modern bidets do not provide users of different sizes, shapes, and sex with the same cleaning experience. Bidets are usually preset to eject water at a given direction, regardless of the size, shape, and sex of the user. Some bidets allow a user to manually control the direction of the ejected water, but this process is cumbersome when each user must manually adjust the bidet before usage. Moreover, embarrassing accidents are possible where misadjusted bidet could spray water on user's cloths or surrounding furniture or walls.

Accordingly, a need exists for a bidet that automatically identifies the types of orifices, locations of orifices, sizes of orifices, shapes of orifices, gender of a user, and special anatomical conditions (e.g. hemorrhoids); calculates the proper bidet settings (e.g. fluid and air ejection direction, fluid and air pressure, and cleaning patterns, etc.), and uses machine learning software to develop a model of the user's anatomy and conditions. Machine learning is also used evaluate the cleaning results and adjust the cleaning cycle to achieve better cleaning results.

U.S. Pat. No. 5,201,080 discloses a bidet that uses color differences, brightness differences, and edge detection of a user sitting on the bidet to construct a simplified diagram. This diagram (illustrated in FIG. 2 of U.S. Pat. No. 5,201,080) is supposed to crudely represent the user's lower body on the bidet. This diagram is not constructed using visual object recognition as there is no analysis of the user's lower body to determine the category or identification of the user's human lower orifices. Instead, the bidet assumes that the user's anus will always be in the approximate midline of the diagram and be detected by the thick edges and differences in color.

This bidet suffers from several problem and limitations. First, the color or contrast differences of a user may not be easily determined or detected (if the user has darker skin tones, or the bidet is located in lower light environments). Second, the user may not always be centered on the bowl and the resulting image (and edges) will not correspond to diagram (if the user is a small adult or child). Third, the user may have moles, birth marks, or hair that may clutter the diagram or be mistaken for orifices that make detection of the edges difficult and unreliable. Fourth, for obese users, parts of the orifices may not be readily detectable by simple edge detection or changes in brightness because they may be covered by fat tissue.

The subject invention overcomes the limitations of the bidet disclosed by U.S. Pat. No. 5,201,080. The subject invention is a bidet that incorporates formal visual object recognition techniques. This bidet recognizes, identifies, and segments lower human body orifices for all user sizes, shapes, skin tones, gender, and skin conditions.

SUMMARY OF THE INVENTION

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

In embodiments of the subject invention, the term "software" refers to, and includes, executable code algorithms processed by computer systems, and dedicated hardware running Hardware Description Language (HDL) algorithms in Field-Programmable Gate Arrays (FPGA), or Complex Programmable Logic Device (CPLD), or Application-Specific Integrated Circuits (ASIC).

In embodiments of the subject invention, the term "images" refers to a set of one or more digital images that can take many forms including, but not limited to, digital camera images, digital video sequences, or medical scanner images.

In embodiments of the subject invention, the term "computer vision" refers to techniques and methods for acquiring, processing, analyzing, and understanding digital images and videos. These computer vision techniques and methods include, but are not limited to, visual object recognition, object classification, object identification, object detection, image processing, pattern matching, and pattern recognition.

The subject invention discloses an electronic bidet system with machine learning computer vision software containing a first computation model of human genital and rectal areas and a second computational model for cleaning a user's genital and rectal areas, comprising: a water reservoir tank, a bowl with an opening, a seat, a seat lid, at least one fluid nozzle for ejecting fluid, means on the bidet for moving the fluid nozzle in three-dimensions within the bowl, at least one air dryer comprising an air dryer nozzle and means on the bidet for moving the air dryer nozzle in three-dimensions within the bowl, a computing device comprising executable software, a memory storage device, a camera contained within the bowl, wherein the camera is operatively connected to the computing device, a bowl light proximate to the camera, at least one actuating device for activating the bidet, further wherein the camera captures a first plurality of images of the genital and anal regions of the user through the bowl opening of the bidet, wherein the first plurality of images is transmitted to the computing device and analyzed with machine learning computer vision software to identify and locate the types, sizes, shapes, and positions of the lower body orifices in the user's genital and rectal areas, wherein the computing device sends a signal to the means for moving the fluid nozzle in three-dimensions to automatically adjust the nozzle to eject fluid for cleaning the user's genital and rectal areas, wherein the camera captures a second plurality of images of the genital and anal regions of the user through the bowl opening of the bidet, wherein the second plurality of images is transmitted to the computing device and analyzed with machine learning computer vision software to identify any unclean areas of the lower body orifices in the user's genital and rectal areas, wherein an identification of unclean areas sends a signal to the means for moving the fluid nozzle in three-dimensions to automatically adjust the nozzle to eject fluid for cleaning the user's unclean areas in the genital and rectal areas, wherein the camera continues capturing additional pluralities of images of the genital and anal regions of the user for analysis with the machine learning computer vision software to identify any unclean areas of the lower body orifices in the user's genital and rectal areas until no more unclean areas are identified, further wherein the computing device sends a signal to the means for moving the air nozzle in three-dimensions to automatically adjust the air nozzles to eject dry air for drying for the user's genital and rectal areas, wherein the first computational model of the human genital and rectal areas and the second computational model for cleaning the user's genital and rectal areas are updated with the results of each analysis of the machine learning computer vision software each time the user uses the bidet system.

The subject invention also discloses an electronic bidet system with machine learning computer vision software containing a first computational model of human genital and rectal areas and a second computational model for cleaning a user's genital and rectal areas, comprising: a water reservoir tank, a bowl with an opening, a seat, a seat lid, at least one fluid nozzle for ejecting fluid, means on the bidet for moving the fluid nozzle in three-dimensions within the bowl, at least one air dryer comprising an air dryer nozzle and means on the bidet for moving the air dryer nozzle in three-dimensions within the bowl, a computing device comprising executable software, a memory storage device, a camera contained within the bowl, wherein the camera is operatively connected to the computing device, a bowl light proximate to the camera, at least one actuating device for activating the bidet, further wherein the camera captures a first video of the genital and anal regions of the user through the bowl opening of the bidet, wherein the first video is transmitted to the computing device and analyzed with machine learning computer vision software to identify and locate the types, sizes, shapes, and positions of the lower body orifices in the user's genital and rectal areas, wherein the computing device sends a signal to the means for moving the fluid nozzle in three-dimensions to automatically adjust the nozzle to eject fluid for cleaning the user's genital and rectal areas, wherein the camera captures a second video of the genital and anal regions of the user through the bowl opening of the bidet, wherein the second video is transmitted to the computing device and analyzed with machine learning computer vision software to identify any unclean areas of the lower body orifices in the user's genital and rectal areas, wherein an identification of unclean areas sends a signal to the means for moving the fluid nozzle in three-dimensions to automatically adjust the nozzle to eject fluid for cleaning the user's unclean areas in the genital and rectal areas, wherein the camera continues capturing additional videos of the genital and anal regions of the user for analysis with the machine learning computer vision software to identify any unclean areas of the lower body orifices in the user's genital and rectal areas until no more unclean areas are identified, further wherein the computing device sends a signal to the means for moving the air nozzle in three-dimensions to automatically adjust the air nozzles to eject dry air for drying for the user's genital and rectal areas, wherein the first computational model of the human genital and rectal areas and the second computational model for cleaning the user's genital and rectal areas are updated with the results of each analysis of the machine learning computer vision software each time the user uses the bidet system.

In further embodiments of the subject invention, once the user is finished with the electronic bidet system, the camera captures a first plurality of images of the bowl and seat lid, wherein the first plurality of images is transmitted to the computing device and analyzed with machine learning computer vision software to identify any unclean areas on the bowl and seat lid, wherein an identification of unclean areas sends a signal to the means for moving the fluid nozzle in three-dimensions to automatically adjust the nozzle to eject fluid for cleaning the bowl and seat lid, wherein the camera continues capturing additional pluralities of images of the bowl and seat lid for analysis with the machine learning computer vision software until no more unclean areas are identified.

In additional embodiments of the subject invention, once the user is finished with the electronic bidet system, the camera captures a first video of the bowl and seat lid, wherein the first plurality of images is transmitted to the computing device and analyzed with machine learning computer vision software to identify any unclean areas on the bowl and seat lid, wherein an identification of unclean areas sends a signal to the means for moving the fluid nozzle in three-dimensions to automatically adjust the nozzle to eject fluid for cleaning the bowl and seat lid, wherein the camera continues capturing additional videos of the bowl and seat lid for analysis with the machine learning computer vision software until no more unclean areas are identified.

In embodiments of the subject invention, the bidet may further contain a second fluid nozzle for cleaning the fluid discharged from the fluid nozzle onto the user, or cleaning the bowl of the bidet.

In embodiments of the subject invention, the actuating device for the bidet may be a proximity sensor that detects a user sitting on the bidet and automatically activates the bidet. In further embodiments of the subject invention, the proximity sensor may be at least one weight sensor, infrared sensor, or a motion detection camera.

In additional embodiments of the subject invention, the actuating device for the bidet may be a button, a microphone combined with voice recognition software, a smartphone, a tablet, a touchpad, a remote control, or a multi-point touch screen.

In embodiments of the subject invention, pressing the button would initiate a cleaning cycle comprising a washing stage and a drying stage.

In another embodiment of the subject invention, the button would initiate a cleaning cycle comprising a washing stage for a first predetermined number of seconds.

In further embodiments of the subject invention, the button would initiate a cleaning cycle comprising a washing stage for a first predetermined number of seconds and a drying stage for a second predetermined number of seconds.

In further embodiments of the subject invention, the button would initiate a cleaning cycle comprising a washing stage until the machine learning software determined that the areas are sufficiently clean.

In embodiments of the subject invention, the actuating device for the bidet may be two buttons, one for vaginal cleaning, and one for posterior cleaning, wherein pressing either button would initiate a cleaning cycle comprising a washing stage and a drying stage.

In further embodiments of the subject invention, pressing the button for vaginal cleaning would initiate a cleaning cycle of the vaginal area, comprising a washing stage for a first predetermined number of seconds and a drying stage for a second predetermined number of seconds.

In additional embodiments of the subject invention, pressing the button for posterior cleaning would initiate a cleaning cycle of the anus area, comprising a washing stage whose pattern and duration is controlled by the machine learning software until it is deemed that the anus area is sufficiently clean. The machine learning software will automatically learn to improve the cleaning process over time.

In another embodiment of the subject invention, the bidet may contain a bowl light, proximate to the camera that provides lighting for capturing images or video of the user.

In further embodiments of the subject invention, the fluids emitted by fluid nozzle may contain any combination of clean water rinses, hypoallergenic liquid soaps, or special liquids medications for diseases or conditions, such as hemorrhoids. The application of the medications and soap can be controlled by a machine learning software to ensure uniform and complete coverage of the subject area.

In another embodiment of the subject invention, the camera may automatically capture images or videos of the user's genital and anal regions, wherein the additional images or videos are transmitted to the computing device and analyzed with computer vision software to identify and locate the type, shape, size, and position of the anus and genitals of the user, wherein the computing device sends a signal to the means for moving the fluid nozzle and the means for moving the air dryer nozzle in three-dimensions to automatically adjust the fluid nozzle and the air dryer nozzle to compensate for any movements of the user.

In a further embodiment of the subject invention, the camera may automatically captures images or videos of the user's genital and anal regions, wherein the additional images or videos are transmitted to the computing device and analyzed with machine learning computer vision software to determine if the user has passed a distance threshold from the bidet, wherein the computing device sends a signal to the means for moving the fluid nozzle to stop ejecting any fluid and a signal to the to the means for moving the air dryer to stop blowing dry air.

In a further embodiment of the subject invention, the camera may automatically captures images or videos of the user's genital and anal regions, wherein the additional images or videos are transmitted to the computing device and analyzed with machine learning computer vision software to identify any portions of the user that are still soiled, wherein the computing device sends a signal to the means for moving the fluid nozzle and the means for moving the air dryer nozzle in three-dimensions to automatically adjust the fluid nozzle and the air dryer nozzle to compensate for any movements of the user.

In a further embodiment of the subject invention, the machine learning computer vision software may analyze the images or videos of the user's genital and anal regions before and after the user uses the system to determine which portions are soiled. Based on these analyzed images or videos, the computing device may send another signal to the fluid nozzle and the air dryer nozzle to begin another cleaning and drying cycle.

In embodiments of the subject invention, the machine learning computer vision software will identify and locate the anus, testicles, lower penis, vagina, hair clusters, burn marks, hemorrhoids, birth marks, moles, acne, tumors, and soiled locations of the user.

In embodiments of the subject invention, the electronic system of the bidet may be powered by attachment to an electrical line, internal rechargeable batteries, or solar panels.

There have thus been broadly outlined important features of the invention in order that the detailed description thereof that follows may be better understood, and in order that the present contribution to the art may be better appreciated. There are additional features of the invention that will be described hereinafter and which will form the subject matter of the claims appended hereto. These together with other embodiments of the invention, and with various features of novelty which characterize the invention, are pointed out with particularity in the claims annexed to and formed as part of this disclosure.

The term "substantially" is defined as at least close to (and can include) a given value or state, as understood by a person of ordinary skill in the art. In one embodiment, the term "substantially" refers to ranges within 10%, preferably within 5%, more preferably within 1%, and most preferably within 0.1% of the given value or state being specified.

For a conceptual understanding of the invention and its operational advantages, refer to the accompanying drawings and descriptive matter in which there are preferred embodiments of the invention illustrated. Other features and advantages of the present invention will become apparent from the following description of the preferred embodiment(s), taken in conjunction with the accompanying drawings, which by way of example; illustrate the principles of the invention.

BRIEF DESCRIPTION OF THE DRAWINGS

Advantages of the present invention will be apparent from the following detailed description of exemplary embodiments thereof, which description should be considered in conjunction with the accompanying drawings.

DETAILED DESCRIPTION OF EMBODIMENTS

The following will describe, in detail, several embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

As shown in FIGS. 1-5, the subject invention discloses an electronic bidet system 1 with machine learning computer vision software.

Figure 1:
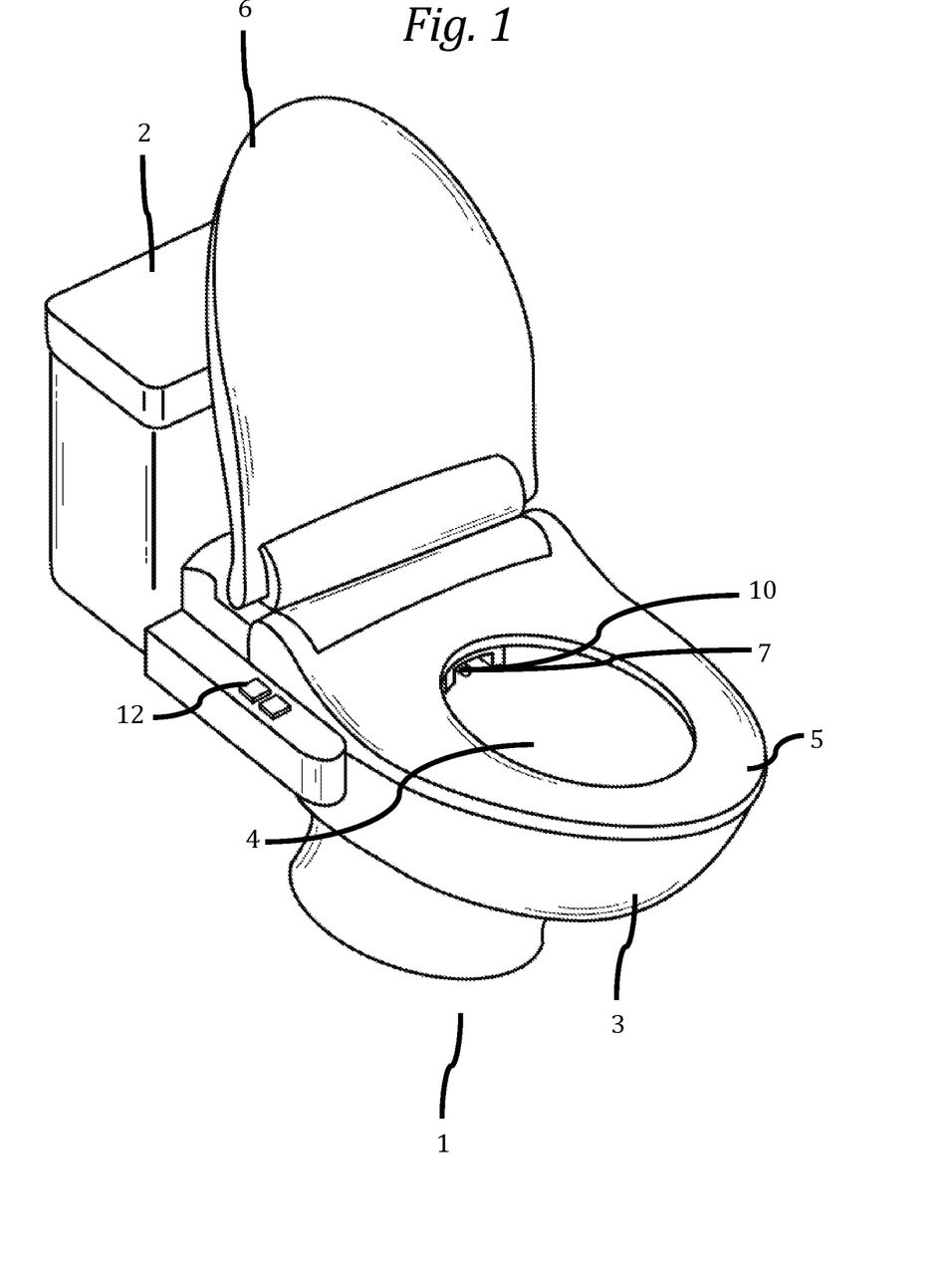
FIG. 1 illustrates a top perspective view of one embodiment of the electronic bidet system with the internal camera and fluid nozzle retracted.
Figure 2:
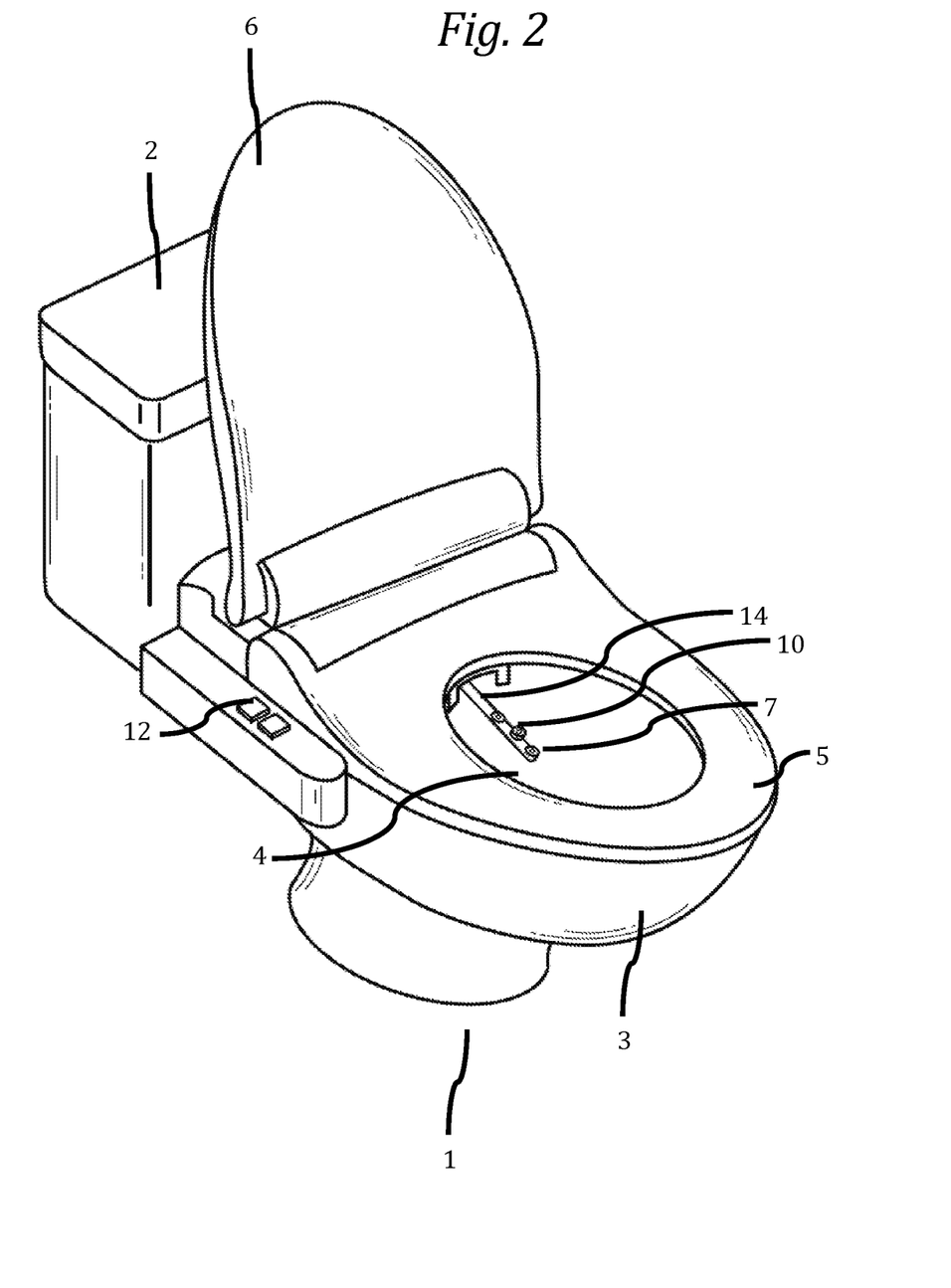
FIG. 2 illustrates a top perspective view of one embodiment of the electronic bidet system with the internal camera and fluid nozzle extended.
Figure 3:
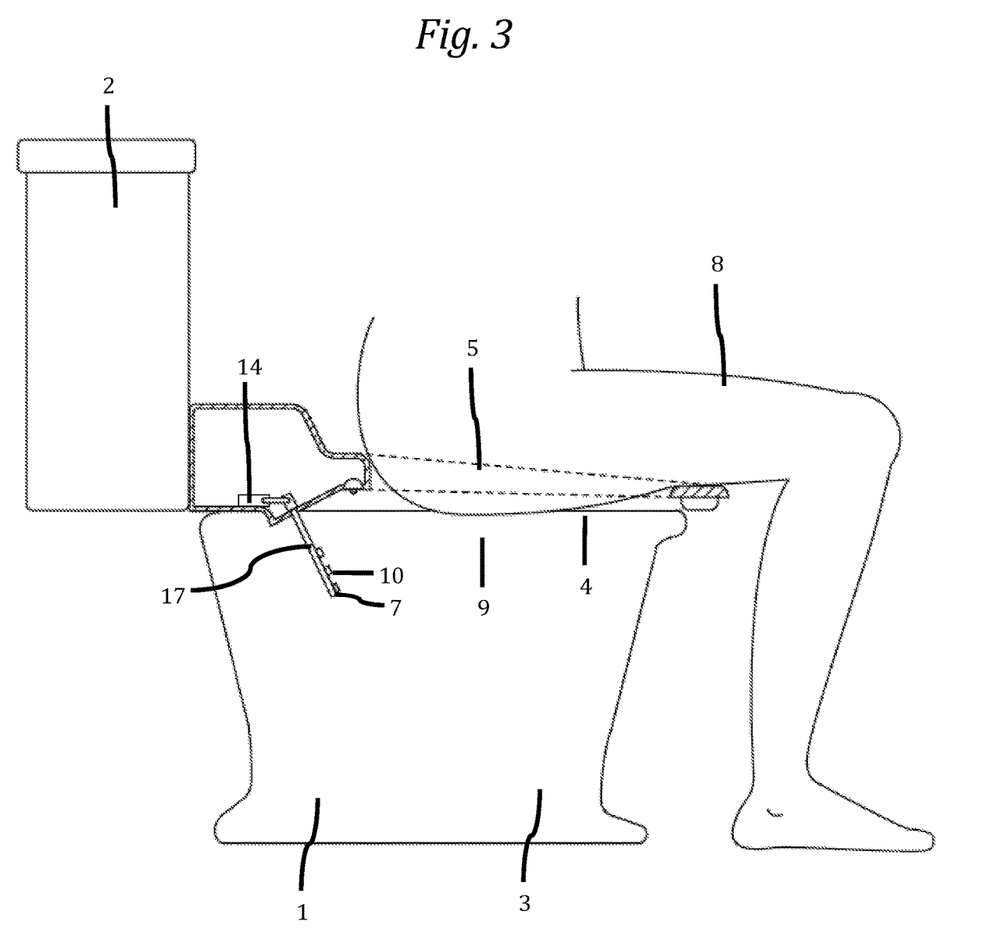
FIG. 3 illustrates a side cross-sectional view of the embodiment of the electronic bidet system with the internal camera and fluid nozzle retracted and a user sitting on the system.
Figure 4:
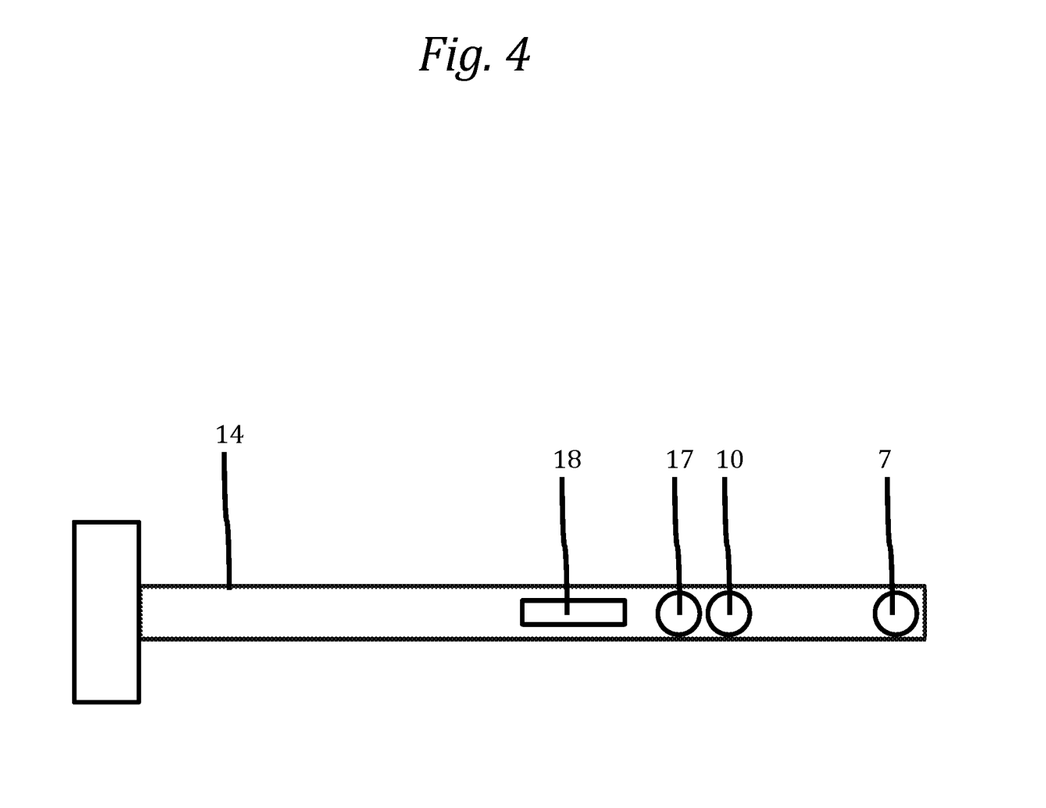
FIG. 4 illustrates a top view of one embodiment of the electronic bidet system with the fluid nozzle which also holds the camera and flash unit, and an air dryer.

The bidet 1 is permanently affixed to a water supplying means (not shown) and include a water reservoir tank 2, a bowl 3 with an opening 4, a seat 5, a seat lid 6, at least one fluid nozzle 7 for ejecting water discharged from the water reservoir tank 2 to a user's 8 genital and rectal areas 9, and a housing for an intelligent camera 10 and a camera flash 17, and an air dryer 18. The fluid nozzle 7 is connected to means 14 on the bidet 1 for moving the nozzle 7 in three-dimensions within the bowl 3 to change the direction of any ejected water. As illustrated in FIG. 4, the air dryer 18 may be connected by means 14 on the bidet 1 for moving the air dryer 18 in three-dimensions within the bowl 3 to change the direction of the blown air. In embodiments of the subject invention, the electronic system of the bidet 1 may be powered by attachment to an electrical line, rechargeable batteries, or solar panels.

Figure 5:
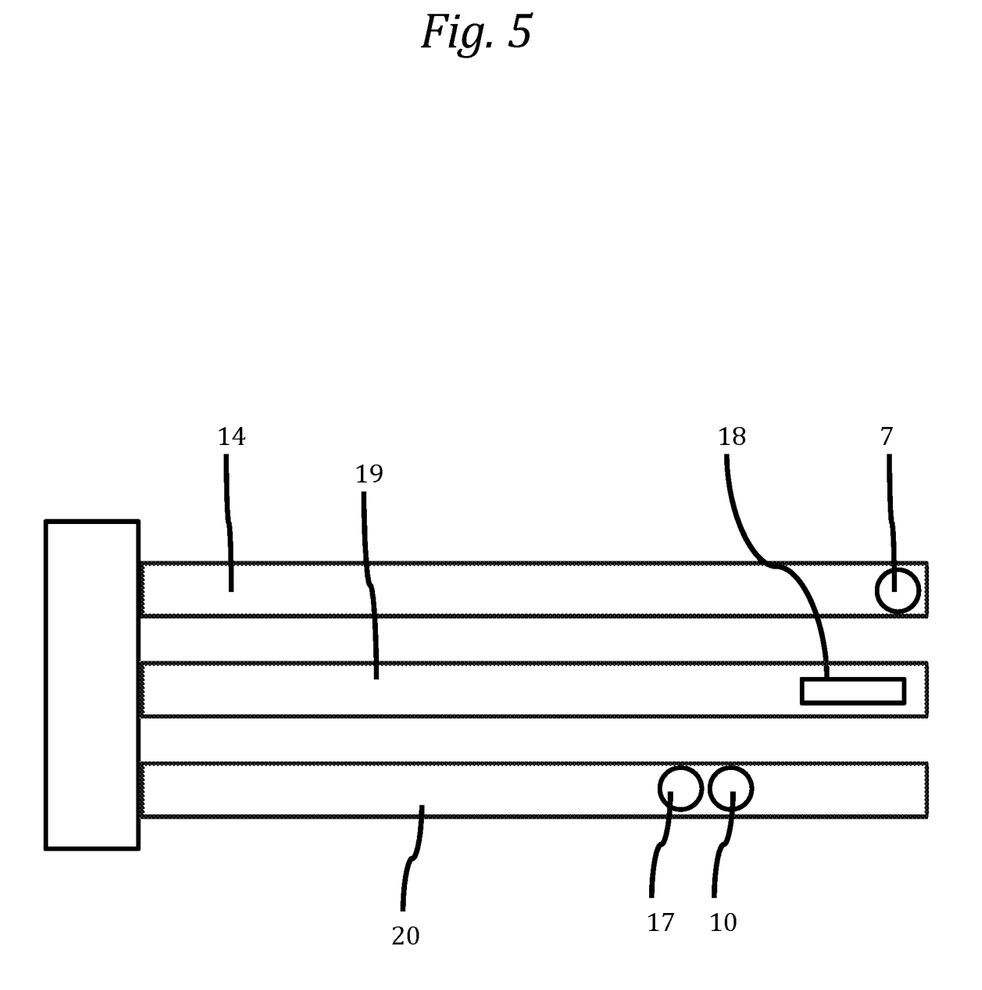
FIG. 5 illustrates a top view of one embodiment of the electronic bidet system with three nozzles. One nozzle to dispense fluid, one nozzle houses the air dryer, and one nozzle to house the camera and flash unit.

The bidet 1 incorporates one or more intelligent cameras 10 contained within the bowl 3, and a controller 11 that is capable of running executable machine learning computer vision software applications. In another embodiment of the subject invention, the intelligent camera 10 and air dryer 18 may be attached to the fluid nozzle 7. As illustrated in FIG. 5, the air dryer 18 may be connected to a separate air dryer nozzle 19 on the bidet 1 for moving the air dryer 18 in three-dimensions within the bowl 3 to change the direction of the blown air. As illustrated in FIG. 5, the intelligent camera 10 and camera flash 17 may be connected to a separate nozzle 20 on the bidet 1 for moving the intelligent camera 10 and flash 17 in three-dimensions within the bowl 3. The controller 11 further executes software that operatively connects weight or infrared sensors, the fluid nozzles 7, the means 14 for moving the nozzle 7 in three-dimensions, and the intelligent camera 10 with controller 11.

As a user 8 approaches the bidet 1, sensors detect the user 8 and send a signal to the controller 11. In embodiments of the subject inventions, these sensors may be infrared sensors that detect projected infrared light reflected off an approaching user, or weight sensors contained within the seat 5. In another embodiment of the subject invention, the controller 11 is not activated until the user 8 presses a button 12, or another actuating device, on the bidet 1 that operatively connected to the controller 11. Embodiments of other actuating devices of the bidet 1 may include a remote control, a microphone combined with voice recognition software, a smartphone, a tablet, a touchpad, or a multi-point touch screen.

Once the user 8 sits on the seat 5 of the bidet 1, and the controller 11 is activated, the controller sends a signal to the internal intelligent camera 10 to capture one or more digital images 13, or a live video feed, of the user's 8 rectal and genital regions 9 through the bowl opening 4 of the bidet 1. In a further embodiment of the subject invention, the bidet contains a separate motion detection camera 13 that activates the bidet once a user 8 sits on the seat 5.

The images, or video feed, are transmitted to the controller 11 and analyzed using machine learning computer vision software to identify and locate lower body orifices in user's 8 genital and rectal areas 9 and their locations, sizes, and shapes. In embodiments of the subject invention, the computer vision software will identify and locate the following categories of objects to be located and tracked: anus, testicles, lower penis, vagina, hair clusters, and various skin disease or conditions, including burn marks, hemorrhoids, birth marks, moles, acne, and tumors. The machine learning computer vision software will use object models to assign scores or confidences to the category of each detected object on the user's 8 rectal and genital regions 9. The machine learning computer vision software will suppress any redundant or conflicting detections.

Based on these analyzed images, the controller 11 sends a signal to the means 14 for moving the nozzle 7 in three-dimensions to automatically adjust the nozzle 7 to eject water to clean and air to dry for the specific types of orifices, locations of orifices, sizes of orifices, shapes of orifices, gender, body type, weight, and other characteristics of the user 8. In one embodiment of the subject invention, the default cleaning action of the nozzle 7 will clean the anus and vagina of a woman user 8, or clean the anus of a man user 8.

The controller 11 will store and the plurality images from each use of the bidet 1 by the user 8. The controller 11 software will use machine learning software to build a model of the user's 8 lower body orifices from the image data. The controller 11 will use this model to improve recognition of the specific user 8 and improve the efficiency of the bidet 1 for each use by the user 8.

The controller 11 will use the machine learning software to efficiently clean the user's 8 rectal and genital regions 9 under normal and abnormal circumstances. For example, abnormal circumstances could include, but are not limited to: cleaning the user's 8 anus, when the user 8 has developed hemorrhoids, by using one fluid nozzle 7 to move the hemorrhoid so that another fluid nozzle 7 can clean both sides of the anus; or cleaning the user's 8 rectal and genital regions 9 after diarrhea, where the feces are smeared not only around the anus but around the buttocks, testicles, and genitalia of the user 8. In case of explosive diarrhea, the controller 11 will clean the bowl 3 by aiming the fluid nozzles 7 at the dirty spots and increase the water pressure until the spots are cleaned.

The controller 11 will use machine learning software to determine a model of clean user's 8 rectal and genital regions 9. The controller 11 will continue cleaning until the user's 8 rectal and genital regions 9 are sufficiently clean, or stop the cleaning if is determined that a spot is not feces and cannot be cleaned. The controller 11 will use machine learning software to clean the lower body of a female user 8 including proper cleaning of the vagina using multiple fluid nozzles 7 to be able to clean between the vaginal folds.

The machine learning software uses computer vision and computational learning theory, to generate a computational model of a user 8, that can learn from and make predictions on additional data obtained from the user 8 with multiple uses of the bidet 1. The machine learning computational model is trained and executed to recognize patterns in the user's 8 rectal and genital regions 9 that represent unclean segments, injuries, or inflammatory conditions. The end-result of such analysis is to improve the computational model of the user's 8 rectal and genital regions 9 for more efficient and better cleaning by the bidet 1.

In embodiments of the subject invention, the actual computational models and techniques used for the machine learning software include, but are not limited to, supervised learning models such as CNNs (convolutional neural networks), unsupervised learning, semi-supervised learning, reinforcement learning, representation learning, rule-based machine learning, similarity and metric learning, support vector machines, regression algorithms, instance-based algorithms, regularization algorithms, decision tree algorithms, Bayesian algorithms, clustering algorithms, association rule learning algorithms, artificial and traditional neural networks, deep learning algorithms, dimensionality reduction algorithms, ensemble algorithms, random-forest models, traditional stochastic models, and symbolic learning.

The bidet system 1 may also contain a light, or flash 17, within the bowl 3, proximate to the camera 10 that provides lighting for capturing images or video when there is no to little light within the bowl 3 (e.g. where the user 8 is very obese and blocks light entering through bowl opening 4, or a blind user 8 who is using the bidet 1 in the dark).

In embodiments of the subject invention, the washes emitted by fluid nozzle 7 may comprise any combination of clean water rinses, hypoallergenic liquid soaps, or special liquids medications for diseases or conditions, such as hemorrhoids. In further embodiments, the fluid nozzle 7 may emit appropriate bowl 3 cleaners.

In further embodiments of the subject invention, the controller 11 may direct the fluid nozzle 7 to engage in special cleaning actions for unusual anatomical conditions or physical problems (e.g. hemorrhoids, moles, burn marks, or tumors) that are detected by the computer vision software. The cleaning action can be automatically adjusted for pre-determined conditions.

In one embodiments of the subject invention, the camera 10 may automatically capture images of the user 8. The controller 11 may further include object tracking software to track any movements of the user 8 on the seat 5. In embodiments of the subject invention, the computer vision software will identify and locate the detected objects by category in the captured multiple images.

Based on these analyzed images, the controller 11 sends a signal to the means 14 for moving the nozzle 7 in three-dimensions to automatically compensate the nozzle 5 for any movements of the user 8.

The machine learning computer vision software may also determine what portions of the user's 8 genital and rectal areas 9 are soiled. The camera 10 may automatically capture multiple images of the user 8 before the user 8 uses the bidet 1, and after each wash cycle. These images are compared and any differences may be deemed soiled by the computer vision software. Based on these analyzed images, the controller 11 sends a signal to the nozzle 7 to begin another cleaning cycle.

The controller 11 in the bidet 1 may automatically stop the nozzle 7 after a pre-determine wash cycle and the computer vision software no longer detects any waste on the user's 8 genital and rectal areas 9. In another embodiment of the subject invention, the controller 11 in the bidet 1 may automatically stop the nozzle 7 when the computer vision software detects that the user 8 has begun to move away from seat 5. The controller 11 may also activate the flushing mechanism of the bidet 1 once the computer vision software no longer detects the presence of the user 8 on seat 5.

In further embodiments of the subject invention, the nozzle 7 of the bidet 1 may automatically stop after a pre-determined number of washes, or the button 12 is pressed by the user 8.

After a user 8 has finished using the bidet 1, the controller 11 may send a signal to the camera 10 to take images of the bowl 3, bowl opening 4, seat 5, seat lid 6, and the fluid nozzle 7. The images are transmitted to the controller 11 and analyzed using computer vision software to identify which portions of the bidet 1 must be cleaned. Based on these analyzed images, the controller 11 sends a signal to the means 14 for moving the other fluid nozzles in three-dimensions to automatically clean the bidet 1 components.

Figure 6:
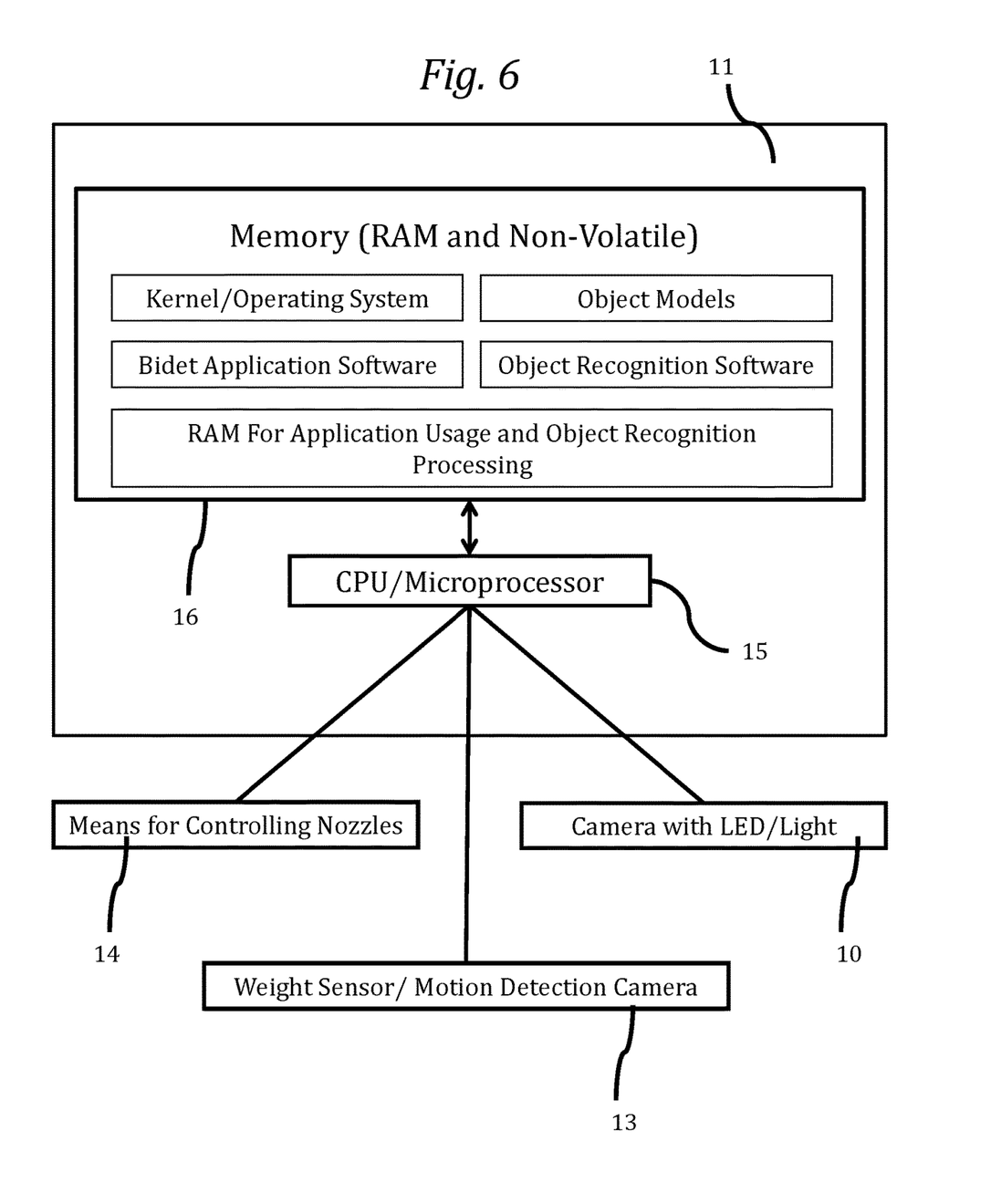
FIG. 6 is a block diagram illustrating a configuration of the electronic bidet system.

FIG. 6 illustrates a block diagram that depicts one embodiment of the controller 11 architecture. The controller 11 may include a CPU/Microprocessor 15, a main RAM/NV memory 16. The CPU/Microprocessor 15 has a capability to interface to the camera 10 either via a built-in peripheral or an external peripheral through signal communication. This peripheral allows that CPU/Microprocessor 15 to obtain and analyze the images or video captured by the intelligent camera 10. The intelligent camera 10 may contain a flash unit 17 means to light the user's 8 rectal and genital regions 9. A weight sensor or motion detection camera 13 is used to detect the usage of the bidet.

The Memory module 16 may include:

A) a Non-Volatile (NV) Memory to hold the bidet application software and machine learning computer vision software to be executed by the CPU/Microprocessor 15 as well a database of models of human body orifices and anatomical conditions (e.g. hemorrhoids) used by the machine learning computer vision software to recognize, classify, detect, localize, segment, and track the lower body orifices and conditions of a user's 8 rectal and genital regions 9. The Operating system or Kernel may also reside in this NV memory.

B) a Random Access Memory (RAM) needed to process the captured images or video as well as other logic executed by the operating system, machine learning computer vision software, and bidet application software.

Embodiments of the CPU/Microprocessor 15 of the controller 11 may include processors, microprocessors, DSP, multi-core processors, microcontrollers, system-on-chips, field programmable gate arrays (FPGA), application specific integrated circuits (ASIC), application specific instruction-set processors (ASIP), or graphics processing units (GPU).

In a further embodiment, the main memory 16 may store computer retrievable information and software executable instructions and may also include a solid state, magnetic, or optical recording medium.

In embodiments of the subject invention, the underlying architecture of the system may be implemented using one or more computer programs, each of which may execute under the control of an operating system, such as Windows, OS2, DOS, AIX, UNIX, Linux, or a simple kernel.

The many aspects and benefits of the invention are apparent from the detailed description, and thus, it is intended for the following claims to cover such aspects and benefits of the invention, which fall within the scope, and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. An electronic bidet system with machine learning computer vision software containing a first computational model of human genital and rectal areas and a second computational model for cleaning a user's genital and rectal areas comprising: a water reservoir tank, a bowl with an opening, a seat, a seat lid, at least one fluid nozzle for ejecting fluid, means on the bidet for moving the fluid nozzle in three-dimensions within the bowl, at least one air dryer comprising an air dryer nozzle and means on the bidet for moving the air dryer nozzle in three-dimensions within the bowl, a computing device comprising executable software, a memory storage device, a camera contained within the bowl, wherein the camera is operatively connected to the computing device, a bowl light proximate to the camera, at least one actuating device for activating the bidet, further wherein the camera captures a first plurality of images of the genital and anal regions of the user through the bowl opening of the bidet, wherein the first plurality of images is transmitted to the computing device and analyzed with the machine learning computer vision software to identify and locate the types, sizes, shapes, and positions of the lower body orifices in the user's genital and rectal areas, wherein the computing device sends a signal to the means for moving the fluid nozzle in three-dimensions to automatically adjust the nozzle to eject fluid for cleaning the user's genital and rectal areas, wherein the camera captures a second plurality of images of the genital and anal regions of the user through the bowl opening of the bidet, wherein the second plurality of images is transmitted to the computing device and analyzed with the machine learning computer vision software to identify any unclean areas of the lower body orifices in the user's genital and rectal areas, wherein an identification of unclean areas sends a signal to the means for moving the fluid nozzle in three-dimensions to automatically adjust the nozzle to eject fluid for cleaning the user's unclean areas in the genital and rectal areas, wherein the camera continues capturing additional pluralities of images of the genital and anal regions of the user for analysis with the machine learning computer vision software to identify any unclean areas of the lower body orifices in the user's genital and rectal areas until no more unclean areas are identified, further wherein the computing device sends a signal to the means for moving the air nozzle in three-dimensions to automatically adjust the air nozzles to eject dry air for drying for the user's genital and rectal areas, wherein the first computational model of the human genital and rectal areas and the second computational model for cleaning the user's genital and rectal areas are updated with the results of each analysis of the machine learning computer vision software each time the user uses the bidet system, further wherein the first and second computation models are updated with patterns of unclean segments, injuries, and inflammatory conditions of the user's genital and rectal areas.

2. The electronic bidet system of claim 1, wherein the actuating device for the bidet comprises a proximity sensor that detects a user sitting on the bidet and automatically activates the bidet.

3. The proximity sensor of claim 2, wherein the proximity sensor consists of a group selected from infrared sensors, weight sensors, and motion detection cameras.

4. The electronic bidet system of claim 1, wherein the camera further comprises a water repellent protector filter on a lens of the camera.

5. The electronic bidet system of claim 1, wherein the actuating device for the bidet comprises a single button, wherein pressing the button would initiate a cleaning cycle.

6. The electronic bidet system of claim 1, wherein the actuating device for the bidet comprises two buttons, a first button for vaginal cleaning, and a second button for posterior cleaning, wherein pressing either button would initiate a cleaning cycle.

7. The electronic bidet system of claim 1, wherein cleaning and drying cycles of the electronic bidet are controlled, adjusted, varied, and repeated based on the machine learning software.

8. The electronic bidet system of claim 1, wherein the fluids emitted by the fluid nozzle consist of a group selected from the combination of clean water rinses, hypoallergenic liquid soaps, and liquids medications.

9. The electronic bidet system of claim 1, wherein the system is powered by a rechargeable battery.

10. The electronic bidet system of claim 1, wherein the system is powered by solar panels.

11. The electronic bidet system of claim 1, wherein the machine learning computer vision software categorizes and locates areas of the bowl that are soiled and sends a signal to the means for moving the fluid nozzle in three-dimension to clean the soiled areas.

12. The electronic bidet system of claim 1, wherein when the machine learning computer vision software categorizes the user as a woman, the system simultaneous cleans the vagina and anus with a dual spray fluid nozzle.

13. The electronic bidet system of claim 1, wherein the machine learning computer vision software will identify and locate the anus, testicles, penis, vagina, hair clusters, burn marks, hemorrhoids, birth marks, moles, acne, tumors, and soiled locations of the user.

14. The electronic bidet system of claim 1, wherein the machine learning computer vision software maneuvers the means for moving the fluid nozzle in three-dimensions to automatically adjust the nozzle to eject fluid for cleaning a user's hemorrhoidal tissues.

15. The electronic bidet system of claim 1, wherein when the machine learning computer vision software categorizes the user as a woman the machine learning computer vision software maneuvers the means for moving the fluid nozzle in three-dimensions to automatically adjust the nozzle to eject fluid for cleaning the user's vaginal folds.

16. The electronic bidet system of claim 1, wherein the first plurality of images are combined to generate a first video, wherein the first video is transmitted to the computing device and analyzed with the machine learning computer vision software.

17. The electronic bidet system of claim 1, wherein the second plurality of images are combined to generate a second video, wherein the second video is transmitted to the computing device and analyzed with the machine learning computer vision software.

18. The electronic bidet system of claim 1, wherein the first plurality of images are combined to generate a first video and the second plurality of images are combined to generate a second video, wherein the first video and the second video are transmitted to the computing device and analyzed with the machine learning computer software.

* * * * *